United States Patent [19]
Zebuhr

[11] 4,312,401
[45] Jan. 26, 1982

[54] HEAT TRANSFER SYSTEM

[75] Inventor: William H. Zebuhr, Nashua, N.H.

[73] Assignee: Sunhouse, Inc., Nashua, N.H.

[21] Appl. No.: 73,570

[22] Filed: Sep. 7, 1979

[51] Int. Cl.³ .............................................. G05B 1/00
[52] U.S. Cl. ...................................... 165/39; 165/85; 417/14
[58] Field of Search ............................ 165/39; 417/14

[56] References Cited
U.S. PATENT DOCUMENTS 2,006,035  6/1935  Stewart .............................. 165/39 X
3,255,084  6/1966  Doroszlai ......................... 165/39 X Primary Examiner—Albert W. Davis
Attorney, Agent, or Firm—Albert Gordon

[57] ABSTRACT

A heat transfer system for transferring heat into a first body of water flowing through a first conduit (20, 22, 24) from a heated second body of water (12) that is flowing through a second conduit (14), the two conduits being contiguous to each other. A pump (26 or 62) operates to force the second body of water through the second conduit. A motor (32 or 60) is so connected to the pump as to operate the pump when the motor is actuated and an arrangement is provided to actuate the motor in response to the flow of the first body of water through the first conduit.

2 Claims, 7 Drawing Figures

HEAT TRANSFER SYSTEM

BACKGROUND OF THE INVENTION

This invention relates to heat transfer systems wherein a heat transfer takes place between two bodies of fluid flowing through two conduits that are contiguous to each other. It is typical in such a system for the first body of fluid, which may be water in a domestic hot water system that is heated by the heat transfer, to flow sporadically as, for example, when a tap in the domestic hot water system is opened, and for the second body of fluid to be caused to flow by a pump.

SUMMARY OF THE INVENTION

In order to conserve energy and reduce wear and tear, it is desirable that the pump only operate when the first body of fluid is flowing through its conduit and the heat transfer is to take place. This objective is accomplished, in accordance with this invention, by providing an arrangement wherein the pump is operated in response to the flow of the first body of fluid through its conduit.

DESCRIPTION OF THE PREFERRED EMBODIMENTS

Figure 1:
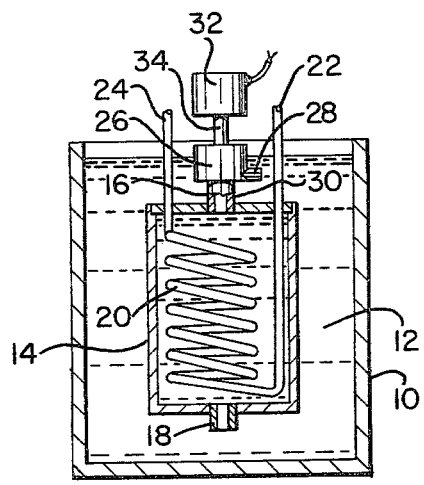
FIG. 1 is a partially sectional elevation of a first species of the heat transfer system.

The heat transfer system shown in FIG. 1 comprises a tank 10 adapted to contain a quantity of water 12 that is heated in any desired manner, for example by the transfer of heated water to the tank from solar panels as shown in U.S. patent application Ser. No. 864324 filed December 27, 1977. A hollow housing 14 is fixedly mounted in the tank 10 in any desired manner. The housing 14 has an inlet opening 16 at its top and an outlet opening 18 at its bottom. A heat exchanger coil 20 is located within the housing. An inlet pipe 22 is connected at its bottom to the bottom of the coil 20 and an outlet pipe 24 is connected at its bottom to the top of the coil 20. The pipes 22 and 24 extend through the top of the housing 14 and upwardly of the tank 10. The inlet pipe 22 is in communication with a source of water under pressure such as a municipal water line or a well. The outlet pipe 24 is in communication with a place of egress for water in the pipes 22 and 24 and the heat exchanger coil 20 such as a water tap in a building. A variable speed pump 26, located in the tank 10, is submerged in the water 12 and is above the housing 14. The pump inlet 28 is in communication with the water 12 and the pump outlet 30 is in communication with the inlet opening 16 of the housing 14. A variable speed electric motor 32 is located above the pump 26 with the output shaft 34 of the motor 32 being so connected to the pump 26 as to operate the pump 26 at a rate that is proportional to the rotational speed of the motor output shaft 34.

Figure 2:
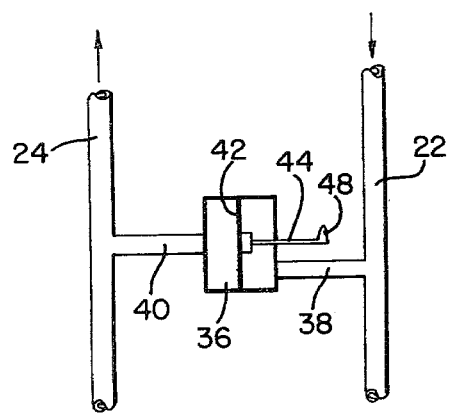
FIG. 2 is a view of a portion of the pump operating mechanism of the species of FIG. 1.
Figure 4:
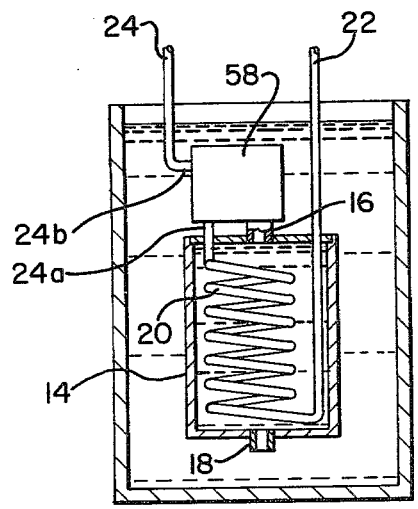
FIG. 4 is a partially sectional elevation of a second species of the heat transfer system.

Referring to FIG. 2, a pressure switch 36 is located between the pipes 22 and 24 and its opposite ends are respectively in communication with the pipes 22 and 24 by pipes 38 and 40. A diaphragm 42 in the pressure switch 36 is distended leftwardly towards the pipe 24 when water is caused to flow through the pipes 22 and 24 as a result of opening the water tap in communication with the pipe 24, this leftward distention of the diaphragm 42 being caused by the water pressure in the pipes 22 and 38 being greater than the water pressure in the pipes 24 and 40, this pressure differential being proportional to the rate of water flow through the pipes 22 and 24. A spindle 44 is connected to the diaphragm 42 for movement therewith.

Figure 3:
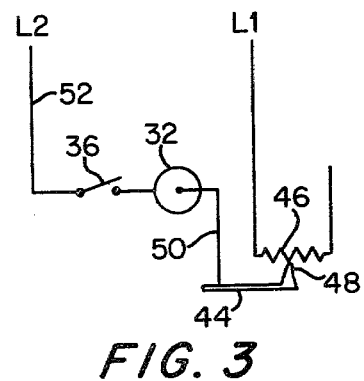
FIG. 3 is a schematic representation of an electric circuit used with the species of FIG. 1.

FIG. 3 shows an electric circuit having lines L1 and L2 connected to a source of electrical power. Line L1 is connected to a resistor 46. A tap 48 on the spindle 44 is in contact with the resistor 46. When the pressure switch 36 is closed due to the pressure differential described above being created, a closed circuit is created between lines L1 and L2 through the resistor 46 the tap 48, the spindle 44, a line 50 extending between the spindle 44 and the motor 32, and a line 52 extending from the motor 32 through the pressure switch 36 to the line L2. The greater the rate of water flow through the pipes 22 and 24, the greater the pressure differential between the pipes 38 and 40, the greater the leftward distention of the diaphragm 42 and the leftward shifting of the tap 48 along the resistor 46. The greater the leftward shifting of the tap 48 along the resistor 46, the smaller the resistance in the electric circuit between lines L1 and L2, and therefore, the greater the rotational speed of the motor 32. Therefore, the speed of the motor 32 and of the pump 26 is proportional to the rate of flow of water through the pipes 22 and 24 and the coil 20.

In the operation of the heat transfer system of FIGS. 1–3, when water is caused to flow through the pipe 22, the coil 20 and the pipe 24, the pump 26 is turned on to cause heated water at the top of the tank 10 to flow into the pump inlet 28, through the pump 26, the pump outlet 30, the housing inlet opening 16, the housing 14, and the housing outlet opening 18 to the bottom of the tank 10. In flowing through the housing 14, the tank water 12 flows past the heat exchanger coil 20 to thereby enable heat to be transferred from the tank water 12 to the water flowing through the heat exchanger 20.

The forcing of the tank water 12 downwardly through the housing 14 creates some turbulence of the water 12 in the housing 14. The extent of this turbulence is dependent on the resistance to exiting of the water from the housing 14 through the outlet opening 18, which, in turn, is dependent on the diameter of the outlet opening and is also dependent on the rate at which the water 12 is forced into the housing 14 by the pump 26. The greater the turbulence, the higher the rate of transfer of heat from the water 12 in the housing 14 to the water flowing through the coil 20. Since the pumping rate of the pump 26 is proportional to the rate of water flow through the pipes 22 and 24 and the coil 20, the degree of turbulence of the water 12 passing through the housing 14 is also proportional to the rate of flow of the water through the pipes 22 and 24 and the coil 20. Thus, it is ensured that the water flowing through the coil 20 will be heated, by heat transfer from the water 12 in the housing 14, a desired amount regardless of the rate of water flow through the coil 20.

Figure 5:
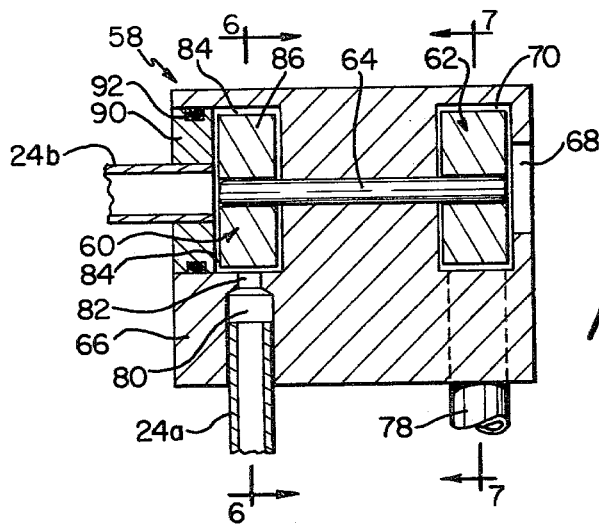
FIG. 5 is a sectional view of a motor-pump assembly forming part of the species of FIG. 4.
Figure 6:
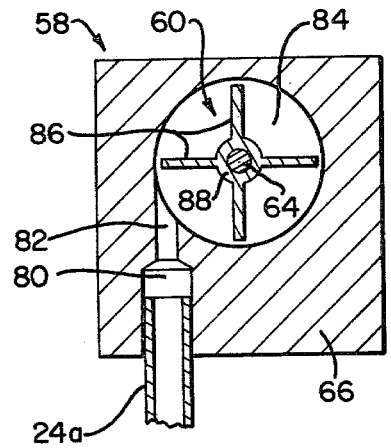
FIG. 6 is a section taken along the line 6—6 of FIG. 5.
Figure 7:
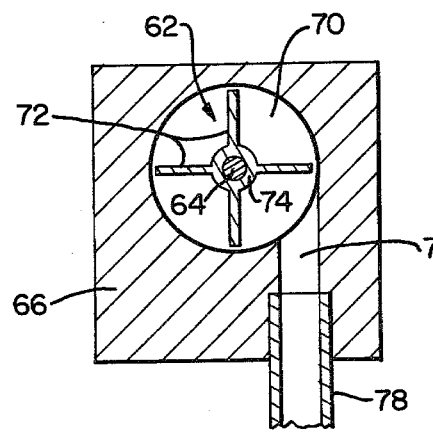
FIG. 7 is a section taken along the line 7—7 of FIG. 5.

In the heat transfer mechanism of FIGS. 4–7, the pump 26 and the motor 32 are replaced by the motor-pump assembly 58 that functions to pump the tank water 12 through the housing 14 at a rate that is proportional to the rate of flow of water through the heat exchanger coil 20 by having the flow of water through the pipe 24 directly operate the motor with the motor in turn operating the pump. As shown in FIGS. 5–7, the motor is in the form of a variable speed turbine 60 and the pump is in the form of a variable speed centrifugal pump 62. The turbine 60 and the pump 62 are connected to each other for unitary rotation by a shaft 64.

The assembly 58 comprises a casing 66. A port 68 in the casing 66 opens into the tank 10 to admit water 12 from the tank 10 into the assembly 58. Within the casing 66, the port 68 communicates with an opening 70 of sufficient size to accommodate blades 72 of the pump 62. The blades 72 extend radially of a hub 74 that is rigidly mounted to the shaft 64. An outlet passage 76 in the casing 66 intersects the opening 70. A pipe 78 connects the passage 76 with the inlet opening 16 of the housing 14. The rotation of the shaft 64 by the turbine 60 causes the blades 72 to force water 12 from the tank 10 into the opening 70 and expel this water through the passage 76, the pipe 78 and the housing opening 16 into the top of the housing 14.

The casing 66 has a motor inlet passage 80 that is in communication with a section 24a of the pipe 24 that is connected to the top of the coil 20. The passage 80 is in communication with a passage 82, and the passage 82 communicates with an opening 84 of sufficient size to accomodate blades 86 of the turbine 60. The blades 86 extend radially of a hub 88 that is rigidly affixed to the shaft 64. The opening 84 is in communication with a section 24b of the pipe 24 that extends upwardly of the tank 10. The pipe section 24b extends through an opening in a plug 90 that is fitted to the casing 66 and is sealed to the casing by a seal 92.

From the foregoing, it can be seen that the flow of water through the pipes 22 and 24 and the coil 20 causes water to flow from the pipe section 24a through the passages 80 and 82, the opening 84 and the pipe section 24b with the flow of water through the opening 84 causing the turbine blades 86 to rotate the shaft 64 and thus operate the pump 62 at a speed proportional to the rate of water flow through the opening 84.

There follows a recapitulation of those portions of the heat transfer systems and their modes of operation that are pertinent to this invention.

The heat transfer system comprises: a first conduit, formed by the pipes 22 and 24 and the coil 20, through which a first body of fluid may flow; a second conduit, formed by the housing 14, through which a second body of fluid (the water 12) may flow; the two conduits being contiguous to each other to enable heat transfer to take place between the two bodies of fluid pursuant to the flow of the bodies of fluid through the conduits; a pump (the pump 26 or the pump 62) operable to force the second body 12 of fluid through the second conduit 14; and actuating means (the elements shown in FIGS. 2 and 3 or the turbine 60) actuable in response to the flow of the first body of fluid through the first conduit 20, 22, 24 to operate the pump 26 or 62. The actuating means is so constructed, as described below, as to cause the pump 26 or 62 to force the second body 12 of fluid through the second conduit 14 at a rate that is proportional to the rate of the flow of the first body of fluid through the first conduit 20, 22, 24.

The second conduit 14 has the inlet 16 at one end and the outlet 18 at its other end. The pump 26 or 62 is so mounted to the second conduit 14 as to be operable to force the second body 12 of fluid from a source (the tank 10) of the second body of fluid through the inlet 16. The first conduit 20, 22, 24 has a mid-portion (the coil 20) that is contiguous to the second conduit 14 where the heat transfer is effected, an entrance end (the pipe 22) through which the first body of fluid may flow towards the midportion 20, and an exit end (the pipe 24) through which the first body of fluid may flow away from the mid-portion 20. The actuating means comprises a motor 32 or 60 so constructed as to operate the pump 26 or 62 when the motor 32 or 60 is actuated and means (the elements shown in FIGS. 2 and 3 or the flow of water through the passage 82 against the turbine blades 86) responsive to the flow of the first body of fluid through the first conduit 20, 22, 24 to actuate the motor 32 or 60.

In the first species of the invention, the motor is the electric motor 32 and the means responsive to the flow of the first body of fluid through the first conduit 20, 22, 24 to actuate the motor 32 comprises: the pressure switch 36 interposed between the entrance end 22 and the exit end 24 of the first conduit so constructed and arranged as to be closed in response to a pressure differential between the entrance end 22 and the exit end 24; and the circuitry shown in FIG. 3 so connecting the switch 36 to the motor 32 as to operate the motor pursuant to the closing of the switch.

The pump 26 is a variable speed pump and the motor 32 is a variable speed motor. The switch 36 and the circuitry of FIG. 3 are so constructed and arranged as to operate the motor 32 at a speed that is proportional to the pressure differential mentioned in the preceding paragraph.

In a second species of the invention, the motor takes the form of the turbine 60 interposed in the first conduit 20, 22, 24 that is so contructed and arranged as to be operated in response to the flow of the first body of fluid through the first conduit. The turbine 60 is a variable speed turbine and the pump 62 of the second species of the invention is a variable speed pump whereby the motor 60 and the pump 62 are operated at speeds that are proportional to the rate of the flow of the first body of fluid through the first conduit.

I claim:

1. A heat transfer system comprising: a first conduit through which a first body of fluid may flow; a second conduit through which a second body of fluid may flow; an inlet at one end of the second conduit and an outlet at the other end of the second conduit; a pump so mounted to the second conduit as to be operable to force the second body of fluid from a source of the second body of fluid through the inlet; a mid-portion in the first conduit that is contiguous to the second conduit where heat transfer takes place between the two bodies of fluid pursuant to the flow of the bodies of fluid through the conduits; an entrance end in the first conduit through which the first body of fluid may flow towards said mid-portion; an exit end in the first conduit through which the first body of fluid may flow away from said mid-portion; an electric motor so connected to the pump as to operate the pump when the motor is actuated; a pressure switch interposed between said entrance end and said exit end and so constructed and arranged as to be closed in response to a pressure differential between said entrance end and said exit end, said pressure differential being responsive to the flow of the first body of fluid through the first conduit; and circuitry so connecting the switch to the motor as to actuate the motor pursuant to the closing of the switch.

2. The system of claim 1 wherein the pump is a variable speed pump and the motor is a variable speed motor; and wherein the switch and the circuitry are so constructed and arranged as to operate the motor at a speed that is proportional to the amount of said pressure differential.

* * * * *